United States Patent [19]

Schumacher et al.

[11] 4,015,835

[45] Apr. 5, 1977

[54] SHOCK ABSORBERS FOR ELEVATORS

[75] Inventors: Günter Schumacher, Neuhausen; Peter Tef, Stuttgart; Max Wiester, Munich, all of Germany

[73] Assignee: R. Stahl Aufzuege GmbH, Stuttgart, Germany

[22] Filed: Aug. 19, 1975

[21] Appl. No.: 605,858

[30] Foreign Application Priority Data

Aug. 21, 1974 Germany .......................... 2440094

[52] U.S. Cl. ................................ 267/124; 187/67; 188/287; 188/322; 267/65 R

[51] Int. Cl.² ........................ B66B 5/28; F16F 9/48

[58] Field of Search ............. 267/64 R, 64 B, 65 R, 267/113, 118, 124, 34; 187/67; 188/286, 287, 314, 316, 318, 322

[56] References Cited

UNITED STATES PATENTS

| | | | |
|---|---|---|---|
| 986,378 | 3/1911 | Furlow | 188/287 |
| 1,494,135 | 5/1924 | Robison et al. | 188/287 |
| 1,658,962 | 2/1928 | Aikens | 188/287 |
| 2,744,587 | 5/1956 | Beck | 187/67 |
| 3,148,869 | 9/1964 | Peterson | 267/65 R X |
| 3,693,767 | 9/1972 | Johnson | 188/318 X |
| 3,788,433 | 1/1974 | Katsumori | 188/314 |
| 3,918,693 | 11/1975 | Zahid | 188/287 X |

FOREIGN PATENTS OR APPLICATIONS

| | | | |
|---|---|---|---|
| 640,862 | 7/1928 | France | 188/318 |

*Primary Examiner*—Johnny D. Cherry
*Attorney, Agent, or Firm*—Bacon & Thomas

[57] ABSTRACT

A shock absorber for use in elevators comprising a hollow piston rod connected to a piston which is movable within a cylinder filled with a fluid and having apertures in the cylinder wall for communication with a surrounding cylindrical expansion chamber and means for providing fluid communication with the interior of said piston rod. The hollow piston is forced into the cylinder during operation of the shock absorber thereby forcing fluid into both the cylindrical expansion chamber and the interior of the piston rod.

14 Claims, 1 Drawing Figure

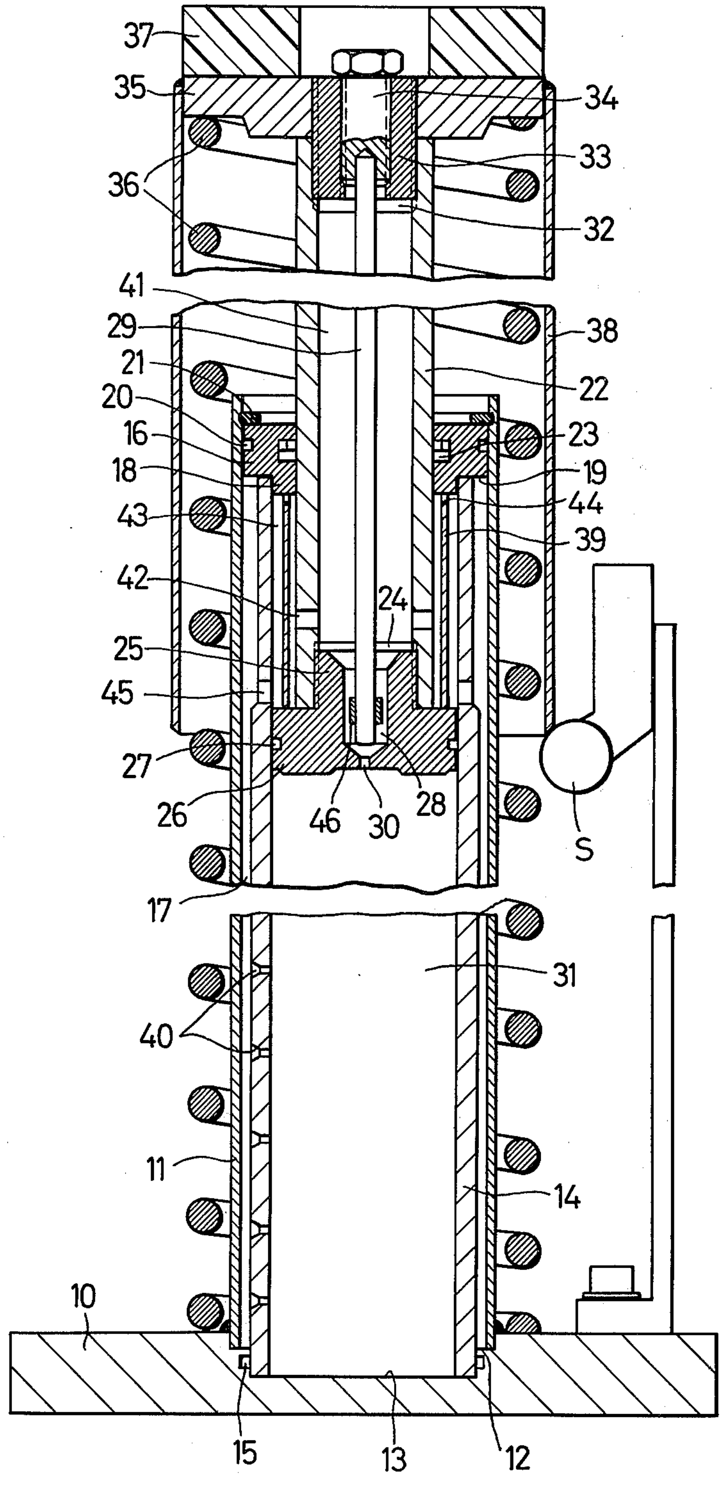
37
35
34
33
36
32
41
29
38
21
22
20
16
23
18
19
43
44
39
42
24
25
45
27
26
46
30
28
S
17
31
40
11
14
10
15
13
12

SHOCK ABSORBERS FOR ELEVATORS

BACKGROUND OF THE INVENTION

1. Field of the Invention

The present invention relates to hydraulic shock absorbers, and more particularly to shock absorbers for use on the passenger cabin of an elevator or for the elevator counter-weights.

2. Description of the Prior Art

Shock absorbers of the above-mentioned type are devices which come into operation only under exceptional circumstances, viz. when, in an emergency, the passenger cabin or the counter-weights of an elevator fail to come to a halt at their lowermost normal stop. This may happen in the case of malfunction of the electrical controls, or in the case of material failure in the elevator suspension system. Emergency shock absorbers of this type are normally mounted on the bottom of the elevator shaft, using a vertically extending hydraulic cylinder and piston combination which, when engaged by the descending passenger cabin, moves against a progressively increasing hydraulic resistance.

In a known shock absorber of this type, the falling passenger cabin first contacts a compressible cushion on the upper end of the extended piston rod, whereupon the latter is forced downwardly into a cooperating cylinder from which a fluid column is displaced through a series of radial orifices in the cylinder wall. The displaced fluid moves into an expansion receptacle. The force with which the fluid column resists the penetration of the piston into the cylinder depends on the number and size of the radial orifices in the wall of the latter. The rate at which this resistance increases with increasing penetration of the piston is a function of the vertical spacing or gradation of these orifices. Consequently, the hydraulic pressure opposing the downward movement of the piston increases as the latter moves downwardly past some of the orifices in the cylinder wall, thereby reducing the number of remaining orifices through which the fluid can pass from the cylinder to the expansion receptacle. A return spring which normally holds the piston rod in its upwardly extended position, is at the same time compressed, but the resistance exerted by this spring is negligible in comparison to the hydraulic resistance in the cylinder. The purpose of this return spring is to automatically extend the shock absorber into its normal position, when the passenger cabin is raised from its overshot position.

The fact that this type of emergency hydraulic shock absorber never comes into operation under regular elevator usage brings with it the tendency that the inspection and servicing of these devices fall victim to neglect, with the risk that, when needed in an emergency situation, they fail to operate properly. This situation has led to officially enforced safety regulations which prescribe periodic inspection and servicing of all elevator shock absorbers, the regulations requiring that each shock absorber be equipped with either a fluid level sight glass or with a dip stick for the verification of the proper fluid level. Additionally, these regulations require that an electrical safety interlock be provided which assures that the shock absorber is always in its upwardly extended ready position.

The visual inspection of the proper fluid level in this type of shock absorber is frequently problematic, because shock absorbers are often mounted on the bottom of an elevator shaft which are difficult to reach for visual inspection. Additionally, fluid level sight glasses are difficult to inspect in the darkness and are readily covered with dust and grime. Fluid level inspection and, if necessary, a refilling of fluid to the required level in the sight glass may thus be very difficult. For this reason, it has become preferable to employ shock absorbers which are equipped with a dip stick. A known hydraulic shock absorber of the dip-stick-type features a vertical cylinder supported on a mounting base and communicating through a passage in that base with an expansion receptacle mounted on the same base. The cylinder and the expansion receptacle thus cooperate in the manner of U-shaped communicating vessels, the expansion receptacle having approximately the same height as the hydraulic cylinder. A dip stick reaching from above into the expansion receptacle serves to indicate the fluid level in the shock absorber.

Because of the need for two separate receptacles mounted on a common base plate and for communicating passages arranged in the latter, this known prior art device is comparatively costly to produce. It also requires a considerable amount of space in the elevator shaft.

SUMMARY OF THE INVENTION

It is therefore a primary objective of the present invention to provide an improved emergency shock absorber for elevators which, while equalling and in part surpassing the operational requirements of prior art shock absorbers, is less expensive to produce and more compact in its overall dimensions.

The present invention utilizes a shock absorber in which the cavity inside the hollow piston rod serves as an expansion receptacle for the displaced fluid, while a dip stick reaches from the upper end of the device, through the hollow piston rod, into a lodgement inside the piston itself, the latter having its normal, extended position located just below the minimum fluid level.

The use of the piston rod as an expansion receptacle for the displaced fluid not only makes it possible to completely do away with the previously necessary separate expansion vessel and its communicating passages, but it also makes it possible to conveniently accommodate the dip stick inside the hollow piston rod. The dip stick is now ideally situated, at the uppermost point of the extended piston rod from where it can be readily removed and re-inserted for inspection purposes. A similar simplification is now afforded, should it become necessary to add fluid to the device, in that the opening for the dip stick also serves as the refill opening.

In a preferred embodiment of the invention, the measuring end portion of the dip stick is accommodated inside an enlarged bore or lodgement in the piston which is attached to the lower end of the hollow piston rod. The bore has a small orifice linking the cylinder space below the piston with the expansion space above it. This arrangement is so compact in design in that only a minimal quantity of hydraulic fluid is required for the proper operation of the shock absorber, thereby eliminating any unnecessary fluid-filled spaces which are costly and which increase the overall space requirements of the device. In actual fact, the fluid column in the shock absorber has to reach only from the bottom of the cylinder to the upper rest position of the piston, the piston seal being preferably just covered by the fluid. In the preferred embodiment of the present invention, this fluid level is such that the lower extremity of the dip stick just reaches into the fluid inside the piston, the piston having an upwardly open enlarged lodgement bore for the dip stick and a small orifice opening from the bore into the fluid column underneath the piston. The size of this orifice can be chosen small enough that it does not affect the desired braking operation of the shock absorber against the falling passenger cabin.

As a further advantageous feature of the invention, there is suggested a piston rod in the form of a length of tubing, preferably of seamless drawn tubing, both tubing end portions being internally threaded. The piston preferably has a matching threaded extension engaging one end of the tubular piston rod for a solid, centered connection. This threaded connection may be secured with an adhesive. The parts required for this type of assembly are extremely simple in configuration, requiring only a minimum of machining operations.

The upper extremity of the tubular piston rod carries a head flange which is similarly screwed into a female threaded portion of the piston rod. Preferably, however, the connection is provided by a separate threaded connecting sleeve which is only partially screwed into the piston rod and which carries on its protruding portion the head flange. A threaded bore inside this connecting sleeve accommodates a refill plug which also carries the dip stick. On the upper side of the head flange is arranged a rubber cushion against which the moving passenger cabin bears when it is to be stopped by the shock absorber. The forces acting between a passenger cabin and the piston are thus transmitted directly from the end faces of the hollow piston rod to the piston and head flange, respectively, without stressing the two threaded connections.

Still another advantageous feature of the present invention calls for the head flange to carry a downwardly extending tubular jacket surrounding the return spring and reaching downwardly such a distance that, in the fully penetrated position of the shock absorber, the jacket stops just short of the shock absorber base. In addition to its protective function, the jacket is also advantageously used to actuate an electrical interlock switch which is part of certain required electronic safety features of the elevator control. The latter are not a part of this invention.

The upper end of the cylinder is preferably arranged a certain distance above the upper rest position of the piston, thereby providing an improved guidance for the piston rod, as well as accommodating a portion of the displaced hydraulic fluid. The guide bushing which forms the upper end closure of the cylinder thus engages the piston rod for sealed guidance, while being held in place against the extremity of the cylinder by means of a stand pipe which surrounds the cylinder over its entire length and thus defines a flow channel for the hydraulic fluid being displaced from the cylinder during operation. This stand pipe, by being permanently welded to the shock absorber base, and by retaining the guide bushing for the piston rod, also conveniently positions the upper end of the cylinder with a suitable centering collar, while the lower end of the cylinder is similarly centered in a recess of the base. This configuration has the additional advantage of making it possible to provide a cylinder of extremely simple tubular shape which is mounted in a centered, confined position, free of clamping or other distortion inducing mounting means.

BRIEF DESCRIPTION OF THE DRAWINGS

Further special features and advantages of the invention will become apparent from the description following below, when taken together with the accompanying drawing which illustrates, by way of example, a preferred embodiment of the invention, represented as follows:

The sole FIGURE of the drawing is a longitudinal cross section of a shock absorber embodying the present invention.

DESCRIPTION OF THE PREFERRED EMBODIMENT

The shock absorber of the invention has a base 10 with suitable bores therethrough (not shown) for the accommodation of anchoring bolts by means of which the shock absorber may be mounted to the floor of an elevator shaft, for example. To the base is attached a vertically extending stand pipe 11, preferably centered inside a shallow recess 12 of the base 10 and welded thereto with a hermetic weld. A somewhat deeper concentric inner recess 13 positions the lower extremity of a cylinder 14 engaging its recess with a close fit. A static seal 15 may be provided at the interface between the inner recess 13 and the cylinder 14, in a suitable groove of the former or latter.

The stand pipe 11 and the cylinder 14 extend vertically in a concentric relationship, defining between them an annular space 17. The stand pipe 11, being somewhat longer than the cylinder 14, holds in its upper end portion a guide bushing 16 which forms an upper closure for the stand pipe 11 and for the cylinder 14. A suitable centering collar 18 centers the cylinder 14, while a downwardly facing shoulder 19 of the bushing 16 retains the cylinder 14 in the axial direction. An O-ring 20, accommodated inside a peripheral groove of the guide bushing 16, provides a hermetic seal, and a retaining ring 21, seated inside a groove near the upper extremity of the stand pipe 11, positions the guide bushing in the vertical direction, thereby indirectly also holding the cylinder 14 in place.

Through the bore of the guide bushing 16 extends a tubular piston rod 22, a collar seal 23 cooperating with the outer diameter of the piston rod 22. The hollow piston rod 22 has a female thread 24 in its lower extremity engaged by a matching threaded extension 25 of a piston 26. Following initial assembly of the piston rod 22 and piston 26, the threaded connection is preferably secured by means of an adhesive. It should be understood, however, that this preferred connection between the piston rod and piston is not a necessary prerequisite for this invention. On its periphery, the piston 26 engages the bore of the tubular cylinder 14 by means of a piston seal 27. A central channel extending vertically through the piston 26 consists of two axially communicating bores, a small orifice 30 opening into the cylinder space 31, and an enlarged lodgement bore 28 for the lower extremity of a dip stick 29. The lodgement bore 28 thus communicates with the cylinder space 31 via the orifice 30 which also serves as a fluid fill opening for the cylinder space 31.

The upper extremity of the tubular piston rod 22 is likewise provided with a female thread 32 into which is screwed a threaded connecting sleeve 33. A central threaded bore in the connecting sleeve 33 accommodates a removable refill plug 34 to which the dip stick 29 is attached so as to extend downwardly into the lodgement 28. The upper half of the threaded connecting sleeve 33 cooperates with a correspondingly threaded head flange 35 which is thereby clamped against the upper end face of the piston rod 22. The head flange 35 serves as an abutment for a return spring 36 which is axially confined between the base 10 and the head flange 35 and surrounds the stand pipe 11. A rubber cushion 37 attached to the upper side of the head flange 35 serves to attenuate the initial impact between a falling passenger cabin and the shock absorber. The fact that both the piston 26 and the head flange 35 are axially clamped against the opposing end faces of the piston rod 22 provides for a direct force transmission between these three parts, without stressing the threaded connections. To the periphery of the head flange 35 is further welded a tubular jacket 38 which extends downwardly on the outside of the return spring 36, thereby enclosing the latter and protecting the otherwise exposed portion of the piston rod 22 and of the guide bushing 16 against dust and grime. The lower extremity of the jacket 38 also conveniently serves to actuate a switch S, the latter being part of a required electrical safety interlock system.

The return spring 36, being preloaded between the base 10 and the head flange 35 of the piston rod assembly, urges the piston rod 22 and the piston 26 upwardly into an end position which is determined by a spacer sleeve 39 arranged inside the cylinder 14, axially between the piston 26 and the guide bushing 16. This spacer sleeve 39 contacts neither the piston rod 22 nor the cylinder 14.

Over the length of the cylinder 14 are arranged a number of calibrated radial orifices 40 through which the fluid contained in the cylinder space 31 can be displaced into the annular space 17, as the piston 26 moves downwardly. The resistive force on the downwardly moving piston 26 is a direct function of the size and number of the radial orifices 40. A suitable gradation of the radial orifices 40 along the height of the cylinder 14 produces a corresponding gradual increase in the hydraulic resistance obtained, as the piston 26 moves past some of the radial orifices, thereby reducing their effective number and correspondingly increasing the total hydraulic flow resistance. It follows from this that, as the piston 26 approaches its lowermost position, it moves progressively more slowly, because only very few of the radial orifices 40 remain open for the displacement of hydraulic fluid from the cylinder 14.

The displaced hydraulic fluid, flowing initially into the annular space 17 between the cylinder 14 and the stand pipe 11, is pushed upwardly inside that space, from where it flows into a differential space 43 between the piston rod 22 and the cylinder 14. This is made possible through suitable passages 45 in the wall of cylinder 14. From there the fluid flows to the inside of the hollow piston rod 22 through radial passages 42 in the wall of the piston rod. The spacer sleeve 39 has flow apertures 44 at one or both of its axial extremities thereby allowing flow of the fluid into passages 42.

The escaping fluid thus flows through the passages 45, via the apertures 44, and through the passages 42, into the cavity 41 of the piston rod. Cavity 41, plus that portion of the differential space 43 and of the annular space 17 which is located above the normal fluid level, add up to the total available expansion space. The passages 45 in the wall of the cylinder 14 are preferably arranged immediately above the upper rest position of the piston 26. In order to further increase the total volume of the expansion space, the cylinder 14 is provided with a reduced outer diameter in that portion which is located above the piston 26, because this cylinder portion is at no time subjected to hydraulic pressures. The result is a very compact design with a minimum of fluid-filled space and an optimal utilization of the cavities of the various tubular components of the shock absorber.

When the passenger cabin is raised after the actuation of the shock absorber in connection with an accidental overtravel, again, the return spring 36 acts to automatically return the piston rod 22 and the piston 26 to their uppermost end position shown in the drawing. During this procedure, the displaced fluid returns from the piston rod cavity 41 and from the differential space 43 into the annular space 17 from where it enters the cylinder space 31 via the radial orifices 40. A very small part of the displaced fluid flows directly from the cavity 41 into the cylinder space 31, through the orifice 30 below the dip stick lodgement 28. The latter, however, is sufficient to permit initial filling of the cylinder space 31 with fluid and later refilling, if that becomes necessary.

In order to avoid misleading readings on the extremity on the dip stick, should the latter accidentally be bent so as to contact the wall of the lodgement bore 28, a spacer member 46 made of resilient material is provided near the extremity of the dip stick 29, preferably above the normal fluid level.

It should be understood, of course, that the foregoing disclosure describes only a preferred embodiment of the invention and that it is intended to cover all changes and modifications of this example of the invention which fall within the scope of the appended claims.

We claim:

1. A hydraulic shock absorber comprising:
 a vertically oriented cylinder,
 a hollow piston rod mounted concentrically with said cylinder,
 a piston connected to the lower end of said piston rod,
 said piston adapted for vertical movement within said cylinder and slidably movable against the walls of said cylinder,
 a cylindrical expansion chamber substantially surrounding said cylinder, said cylinder having apertures therethrough for passage of fluid from the interior of said cylinder to said cylindrical expansion chamber,
 means for providing fluid communication between said cylindrical expansion chamber and the hollow interior of said piston rod,
 whereby fluid from the interior of said cylinder passes into said expansion chamber and said piston rod upon the downward movement of said piston and said piston rod into said cylinder, and
 wherein said piston rod contains a dip stick for measuring the fluid level.

2. A hydraulic shock absorber as recited in claim 1 wherein said piston includes a bore communicating with the interior of said piston rod for housing the lower extremity of said dip stick and said piston has an orifice for providing restricted communication between the interior of said cylinder and said housing bore.

3. A hydraulic shock absorber as recited in claim 2 wherein the top of said piston rod has removable cap means for filling said shock absorber with fluid.

4. A hydraulic shock absorber as recited in claim 3 wherein a sleeve is secured to the upper end of said piston rod for accommodating said removable cap means.

5. A hydraulic shock absorber as recited in claim 3 wherein said removable cap means is fixedly secured to said dip stick.

6. A hydraulic shock absorber as recited in claim 2 wherein said dip stick has a spacer at the end thereof for preventing contact of said dip stick with a surface of said piston.

7. A hydraulic shock absorber as recited in claim 1 wherein said piston and piston rod are threadedly connected.

8. A hydraulic shock absorber as recited in claim 1 further comprising means for biasing said piston rod upwardly whereby said piston is biased toward the upper portion of said cylinder.

9. A hydraulic shock absorber as recited in claim 8 further comprising:

a base member for securing the lower end of said cylinder and said cylindrical expansion chamber, a head flange, means for securing said head flange to the top of said piston rod, and said biasing means comprising a coiled spring positioned between said head flange and said base member.

10. A hydraulic shock absorber as recited in claim 9 further comprising cushioning means mounted on said head flange and an outer jacket member attached to said head flange, said jacket member activating switching means upon the downward movement of said piston rod.

11. A hydraulic shock absorber as recited in claim 1 further comprising a guide bushing between said cylinder and said piston rod, said guide bushing positioned proximate the upper end of said cylinder.

12. A hydraulic shock absorber as recited in claim 11 further comprising a spacer sleeve positioned between said guide bushing and said piston for limiting the upward movement of said piston.

13. A hydraulic shock absorber as recited in claim 12 wherein said spacer sleeve has apertures therethrough, said apertures forming part of said means for providing unrestricted fluid communication between said cylindrical expansion chamber and the interior of said piston rod.

14. A hydraulic shock absorber as recited in claim 12 wherein the portion of said cylinder situated above the limit of the upward movement of said piston is of a smaller outer diameter than the lower portion of said cylinder.

* * * * *